United States Patent [19]

Maida

[11] 4,281,912

[45] Aug. 4, 1981

[54] CONTROL CIRCUIT FOR CAMERA OR MOTOR DRIVE DEVICE

[75] Inventor: Osamu Maida, Tokyo, Japan

[73] Assignee: Nippon Kogaku K.K., Tokyo, Japan

[21] Appl. No.: 139,761

[22] Filed: Apr. 14, 1980

[30] Foreign Application Priority Data

Apr. 21, 1979 [JP] Japan .................................. 54/48538

[51] Int. Cl.³ .......................... G03B 1/00; G03B 17/38
[52] U.S. Cl. ...................................... 354/173; 354/266
[58] Field of Search ......................... 354/131, 173, 266

[56] References Cited

U.S. PATENT DOCUMENTS 3,753,391  8/1973  Kimura et al. .................... 354/173 X
4,015,198  3/1977  Iwashita et al. ................... 354/173 X

*Primary Examiner*—Michael L. Gellner

*Attorney, Agent, or Firm*—Fitzpatrick, Cella, Harper & Scinto

[57] ABSTRACT

A circuit for controlling a camera or a motor drive device by means of a control switch unit connected through a pair of connecting terminals thereof to a pair of remote control terminals of said camera or motor drive device, wherein the control switch unit comprises plural control switches and a voltage generating circuit adapted for generating plural different voltages in response to various combinations of the states of said control switches; and said camera or motor drive device comprises plural voltage detecting circuits of different detecting voltages for detecting the voltages supplied to the remote control terminals. The camera or motor drive device is controlled in response to the outputs from said voltage detecting circuits.

6 Claims, 7 Drawing Figures

CONTROL CIRCUIT FOR CAMERA OR MOTOR DRIVE DEVICE

BACKGROUND OF THE INVENTION

1. Field of the Invention

The present invention relates to a circuit for remote-controlling an electromagnetic shutter release camera or a device capable of electromagnetically controlling the shutter release of a camera, such as a motor drive device.

2. Description of the Prior Art

There is already known a remote control system for a camera or a motor drive device therefor by a control switch unit connected to said camera or motor drive device through plural electric contacts. Such plural electric contacts are required, for example in a camera having an automatic exposure control system, for the two-step operation, wherein the first step is for energizing the electric circuits in the camera and displaying the exposure conditions and the second step is for releasing the shutter of the camera. Although such first step for displaying the exposure conditions is not necessarily required in remote control at a distance from the camera, such displaying function is still required in case the remote control is utilized for preventing mechanical vibration of the camera at the shutter release, for example in close-up photographing such as document copying or in photographing through a microscope. Consequently in the conventional remote control system there have been required two independent terminals for achieving the aforementioned first and second steps in addition to a common terminal. In the miniaturization of the camera or the motor drive device, if a connector is required for remote control it is desirable to have minimum number of terminals for a smaller space, a lower cost, a better design and a higher reliability of the electric contact.

SUMMARY OF THE INVENTION

The object of the present invention is to achieve the aforementioned requirement by reducing to one the number of the electric contacts other than the common terminal in the remote control connector.

DETAILED DESCRIPTION OF THE PREFERRED EMBODIMENTS

Figure 1:
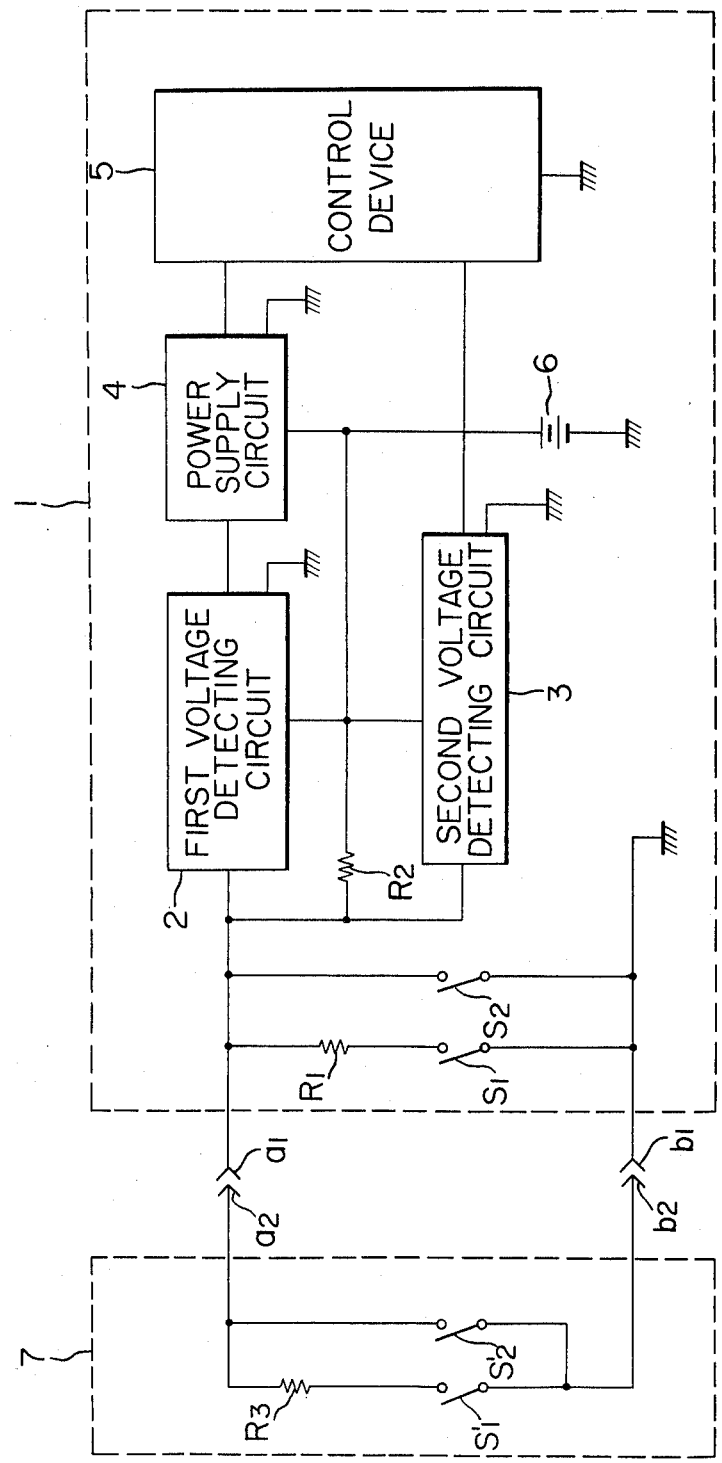
FIG. 1 is a block diagram of a first embodiment.

FIG. 1 shows a first embodiment of the present invention applied to a camera, in which there are shown a camera body 1, a first voltage detecting circuit 2 and a second voltage detecting circuit 3. Each of said circuits 2, 3 provides an output signal in response to an input voltage lower than a threshold voltage, which is selected higher in said first circuit 2 than in the second circuit 3. A power supply circuit 4 provides electric power from a bettery in the camera to a control device 5 for electromagnetic release, automatic exposure control, display of exposure conditions etc. in response to the output from the first voltage detecting circuit 2. Also the output signal from the second voltage detecting circuit 3 is transmitted to an electromagnetic release circuit included in the control device 5 to initiate an exposure in the camera 1. Switches S1 and S2 are so structured as to be closed in succession (firstly Switch S1, secondly Switch S2) along the depressing stroke of an unrepresented shutter button of the camera. The switches S1, S2 are connected, at one terminal thereof, respectively, in common to the grounded line of the power supply in the camera and also to a remote control terminal b1 provided in the camera body 1, said terminal b1 being a common terminal.

The other terminal of the switch S1 is connected through a resistor R1 to the other terminal of the switch S2 and to the input terminals of the first and second voltage detecting circuits 2 and 3, and further to a remote control terminal a1 of the camera body 1. The input terminals of the first and second voltage detecting circuits 2, 3 are connected through a resistor R2 to the positive pole of a battery 6. A control switch unit 7 is connected, through terminals a2 and b2 thereof, to the remote control terminals a1 and b1 of the camera body 1.

In the control switch unit 7 there are provided switches S1' and S2' which are so structured as to be closed in succession along the depressing stroke of an unrepresented push button. The switches S1', S2' are connected, at one terminal thereof, respectively in common to the terminal b2 to be connected to the terminal b1 of the camera body 1. The other terminal of the switch S1' is connected through a resistor R3 to the other terminal of the switch S2' and to the terminal a2 to be connected to the remote control terminal a1 of the camera body, the resistor R3 having resistance equal to that of the resistor R1.

The above-explained circuit functions in the following manner. When the unrepresented shutter button of the camera is not depressed, the switches S1, S2 are both open so that to the first and second voltage detecting circuits 2, 3 is applied through the resistor R2 the voltage of the battery 6 which is higher than the detecting voltages of the respective detecting circuits. Consequently the power supply circuit 4 is not operative, so that the control device 5 receives no power supply and consume no electric power upon half depression of the shutter button, the switch S1 alone is closed, whereby the first and second voltage detecting circuits 2, 3 receive an input voltage obtained by dividing the voltage of the battery 6 by the resistors R1 and R2. The detecting voltages of the first and second voltage detecting circuits 2, 3 are so selected that said divided input voltage is detected by said circuit 2 but not by the circuit 3, whereby the circuit 2 transmits a detection signal to the power supply circuit 4 to perform the display of the measured light intensity and the exposure conditions through the control device 5. Upon further depression of the shutter button the switch S2 is closed to reduce the input voltage of the circuits 2, 3 completely to the ground level, and the circuits 2, 3 both produce detection signals to continue the function of the control device 5 energized by the power supply circuit 4 and to activate, by the output of said second circuit 3, the electromagnetic shutter release circuit of the control device 5 thereby initiating the exposure.

The switches S1', S2' in the control switch unit 7 connected to the remote control terminals a1, b1 respectively replace the switches S1, S2 and control the circuits 2–5. In other words, the closure of the switch S1' is equivalent to the closure of the switch S1 and the closure of the switch S2' is equivalent to the closure of the switch S2.

Figure 2:
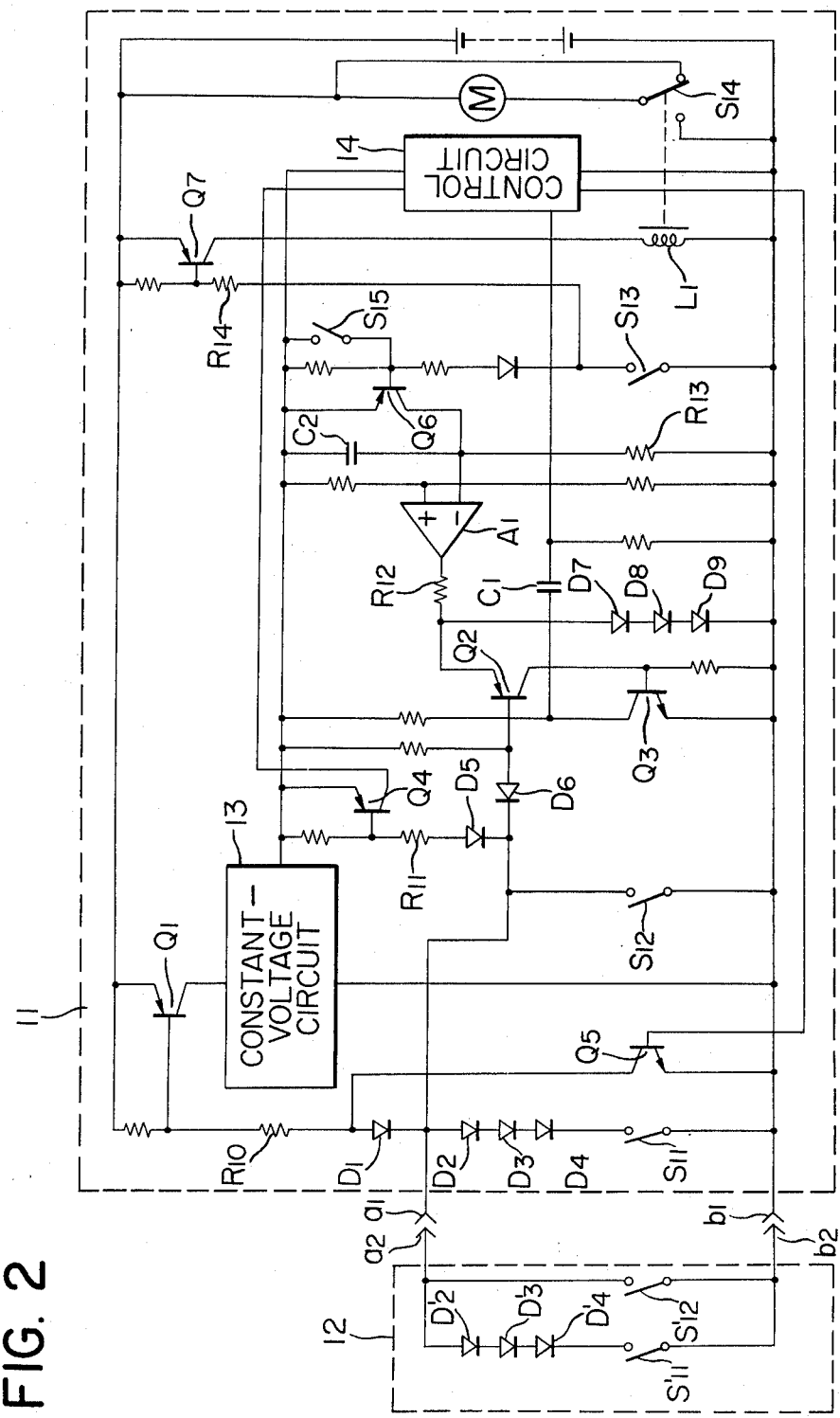
FIG. 2 is a circuit diagram of a second embodiment.
Figure 6:
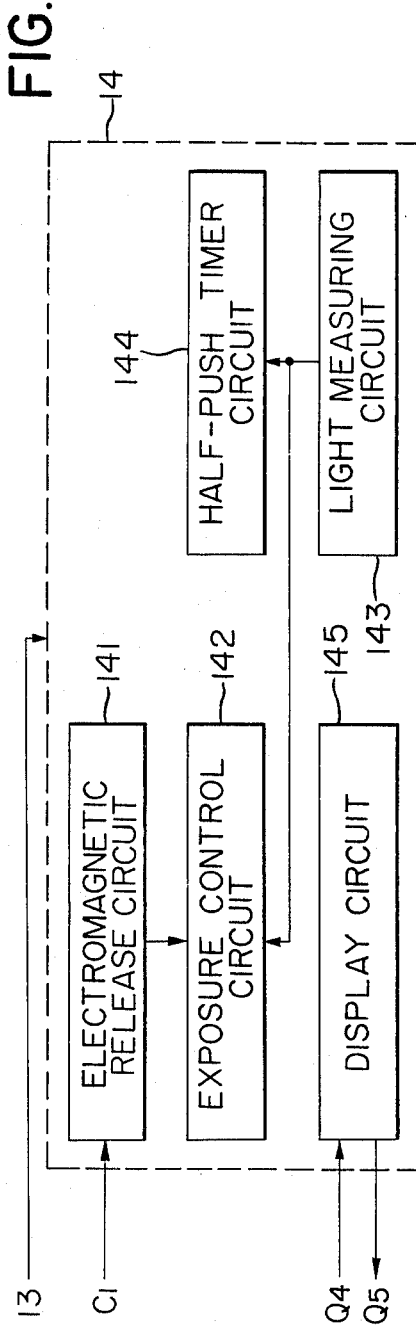
FIGS. 6 and 7 are block diagrams showing, respectively the interior of the control devices 14, 25 shown in FIGS. 2 and 3.

FIG. 2 shows a second embodiment of the present invention wherein a camera 11 is provided therein with a film advancing or take-up motor M. The first voltage detecting circuit 2 and the resistor R2 shown in FIG. 1 are replaced by a transistor Q1, a resistor R10 and a reverse current blocking diode D1, wherein the transistor Q1 also functions as the power supply circuit 4 in FIG. 1. The collector of the transistor Q1 is connected to a constant-voltage circuit for driving a control circuit 14, to be explained later, with a determined voltage. The cathode of the diode D1 is connected to a switch S11 through diodes D2, D3 and D4, to a switch S12 and to a diode D6. The switches S11 and S12 respectively correspond to the switches S1 and S2 shown in FIG. 1, while the diodes D2, D3 and D4 correspond to the resistor R1. The second voltage detecting circuit 3 shown in FIG. 1 is replaced in the present embodiment by a transistor Q2 of which the base is connected to the anode of the diode D6, and diodes D7, D8 and D9 serially connected to the emitter of the transistor Q2. The output terminal of the second detecting circuit 3, namely the collector of the transistor Q2 is connected to the base of a transistor Q3, of which the switching output signal is transmitted, after being differentiated by a capacitor C1, to the electromagnetic release circuit in the control circuit 14. As shown in FIG. 6, the control circuit 14 is composed of the electromagnetic release circuit 141, an exposure control circuit 142, a light measuring circuit 143, a display circuit 145, and a half-push timer circuit 144 to be explained later, in the known manner as disclosed in the U.S. Pat. No. 3,879,137. A detection circuit for detecting the on-off state of the half-push switch S11 is composed of the transistor Q4, a resistor R11 and a diode D5. The output signal from the transistor Q4 is transmitted to the half-push time circuit provided in the control circuit 14, which functions to turn on a transistor Q5 at a determined period after the transistor Q4 is turned off. The emitter of the transistor Q2 is connected to the output terminal of a comparator A1 through a resistor R12. A release timing circuit is composed of a resistor R13, a capacitor C2, the comparator A1 and a transistor Q6. A film take-up switch S13 is closed upon completion of exposure by the unrepresented camera mechanism and is opened upon completion of the film take-up operation. A drive circuit for a relay coil L1 is composed of resistor R14 and transistor Q7. Upon energization of the relay coil L1, a relay contact S14 is changed over to drive the motor M, thereby activating unrepresented mechanisms for film taking up and shutter charging in the camera. A mode selecting switch S15 selects the continuous photographing mode in the illustrated open state and the single frame photographing mode in the closed state. The above-explained circuit functions in the following manner.

When the unrepresented shutter button of the camera is not depressed the half-push timer circuit of the circuit 14 maintains the transistor Q5 in the off-state, and the switches S11, S12 are both open, so that the transistor Q1 is maintained in the off-state to generate no current in the circuit.

Upon a half-push of the shutter button, the switch S11 is closed to turn on the transistor Q1, whereby the constant-voltage circuit 13 initiates power supply. If the camera 11 has completed the film advancing or take-up operation in this state, the transistor Q6 is maintained in the off-state by the open state of the switch S13, whereby the capacitor C2 is charged through the resistor R13 to the threshold voltage of the comparator A1 to provide a high-level output signal therefrom.

Consequently to the transistor Q2 is applied an emitter voltage determined by the diodes D7, D8 and D9. However the cathode potential of the diode D6 is clamped at a voltage determined by the diodes D2, D3 and D4 to maintain the transistor Q2 in the off-state which thus releases no release signal. In this state the potentials are such that the transistor Q4 is turned on to activate the half-push timer circuit of the control circuit 14 thereby turning on the transistor Q5 and thus maintaining the transistor Q1 in the on-state. Due to the presence of the diode D1, the cathode potential thereof is not affected by the on-state of the transistor Q5. If the half-push switch S11 is opened in this state, the transistor Q4 is turned off whereby the half-push timer circuit is started to maintain the transistor Q5 in the on-state for a determined period, thus maintaining the power supply to the entire circuit. In this state the transistors Q2 and Q4 are not turned on as explained in the foregoing. In this manner, even if the half-push switch S11 is opened, the half-push timer circuit maintains power supply for a determined period to allow the display of the exposure conditions.

Upon complete depression of the shutter button the switches S11, S12 are both closed to turn on the transistors Q1 and Q2, whereby the transistor Q3 is turned on to transmit a negative differentiated pulse through the capacitor C1 to the electromagnetic release circuit of the control circuit 14. Thus initiated is the exposure sequence of an unrepresented exposure mechanism of the camera. Upon completion of the exposure the film take-up switch S13 is closed, and the transistor Q6 is turned on if the switch S15 is opened to select the continuous photographing mode. Thus the capacitor C2 is discharged to shift the output of the comparator A1 to the low-level state, whereby the transistors Q2 and Q3 are turned off to reset the capacitor C1. Also upon turning on of the transistor Q7 the relay coil L1 is energized to change over the switch S14 thereby driving the motor M and performing the film taking up and shutter charging through a known mechanism. Upon completion of the film taking up the film take-up switch S13 is opened to turn off the transistor Q7 thereby stopping the motor M. Simultaneously the transistor Q6 is turned off, so that the capacitor C2 reaches the inverting voltage of the comparator A1 after a determined period to shift the output of said comparator A1 again to the high-level state. If the release switch S12 is still closed in this state, the transistor Q2 of the second voltage detecting circuit is again turned on to initiate the shutter releasing in the foregoing manner. When the shutter button is freed from the depressed state, the transistor Q5 is turned off after a period determined by the half-push timer circuit as explained in the foregoing, so that the transistor Q1 is also turned off to interrupt the current in the circuit. On the other hand in case the switch S15 is closed to select the single frame photographing, the capacitor C2 is not discharged in synchronization with the closing of the switch S13, so that the transistor Q3 is maintained in the on-state as long as the switch S12 is closed. And the circuit 14 is supplied with an AC current through the capacitor C1, so that the shutter releasing function is not re-started until the transistor Q3 is turned on after it is once turned off. Thus, if the switch S15 is closed, the on-off actuation of the switch S12 is required for each shutter releasing function.

A remote control switch unit 12 to be connected to remote control terminals a1, b1 is provided with diodes D2', D3' and D4' substantially corresponding respectively to the diodes D2, D3 and D4, so that switches S11' and S12' in said remote control switch unit 12 are capable of respectively replacing aforementioned switches S11 and S12.

Figure 3:
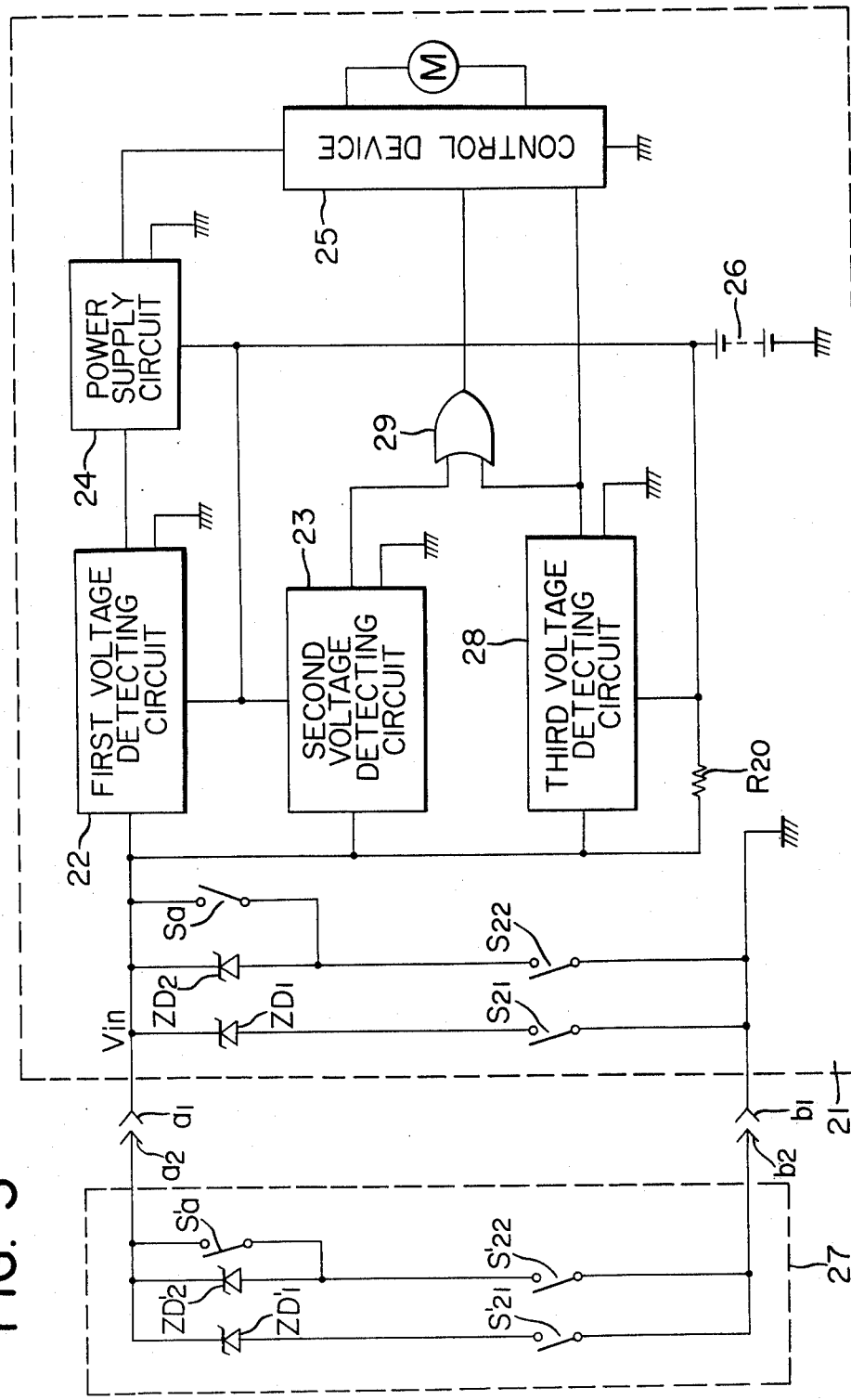
FIG. 3 is a block diagram of a third embodiment.
Figure 7:
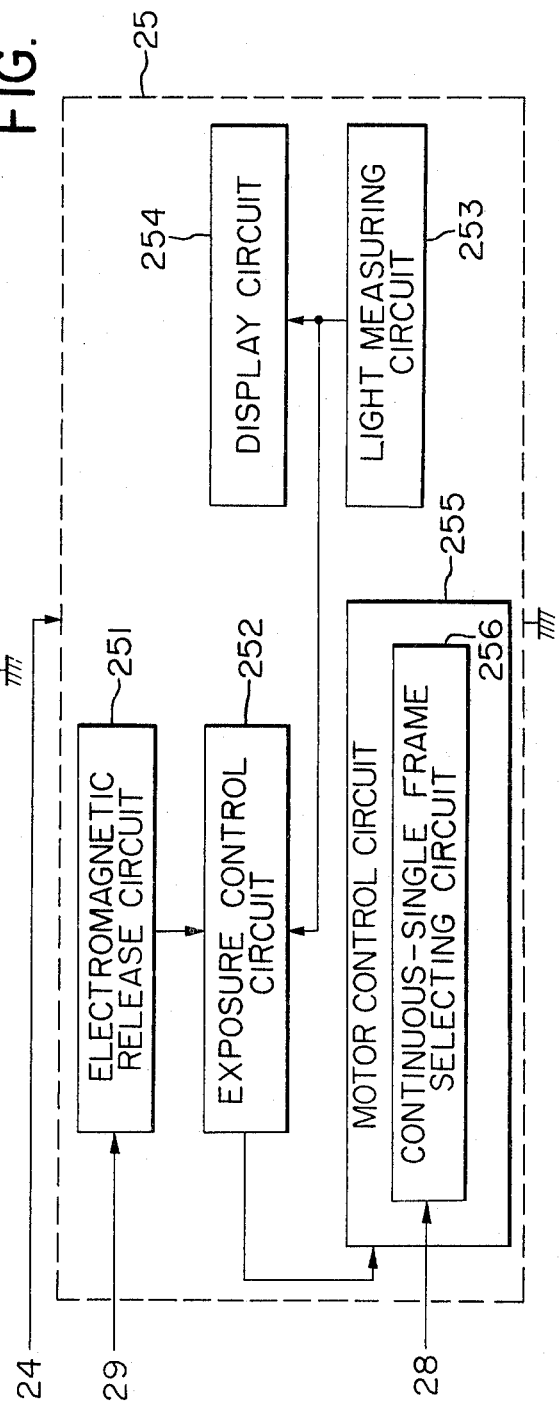

FIG. 3 shows a third embodiment of the present invention, wherein a camera body 21 is provided therein with a motor M for film taking up. Switches S21 and S22 are so structured as to be closed in succession along the depressing stroke of an unrepresented shutter button in camera body 21, the switch S21 being a half-push switch to be closed in the half-push state of said shutter button while the switch S22 being a release switch to be closed when said shutter button is completely depressed. A mode selecting switch Sa of the camera selects the continuous photographing mode in the closed state and the single frame photographing mode in the open state. There are also shown a first voltage detecting circuit 22, a second voltage detecting circuit 23 whose detecting level is lower than that of the first circuit, and a third voltage detecting circuit 28 whose detecting level is lower than that of the second circuit. The detection signal from the first voltage detecting circuit 22 is transmitted to a power supply circuit 24 which supplies the electric power from a power source 26 to a control device 25. As shown in FIG. 7, the control device 25 is provided with a electromagnetic release circuit 251, an exposure control circuit 252, a light measuring circuit 253, a display circuit 254 and a motor control circuit 255.

The detection signals from the second and third voltage detecting circuits 23 and 28 are transmitted through an OR gate 29 to the electromagnetic circuit 251 (FIG. 7) in the control device 25, thereby conducting the shutter release operation the camera body 21 in response to either of the detection signals. The output from the third circuit 28 is also transmitted to a circuit 256 for selecting the continuous or single frame photography which circuit 256 is included in the motor control circuit 255 (FIG. 7) in the control device 25 to select the continuous photographing mode when the detection signal is provided. The input terminals of the first, second and third circuits 22, 23, 28 are connected through a resistor R20 to the positive pole of the power source 26, and connected also to the cathode of Zenar diodes ZD1, ZD2, a terminal of the switch Sa and a remote control terminal a1. The Zenar voltage VZ1 of the Zenar diode ZD1 is selected lower than the lowest service voltage of the power source 26 and higher than the Zenar voltage VZ2 of the Zenar diode ZD2.

The above-explained circuit functions in the following manner. When the switch Sa is open, in response to the half depression of the unrepresented shutter button, the half-push switch S21 is closed whereby the input voltage to the voltage detecting circuits 22, 23 and 28 is clamped at the Zenar voltage VZ1 determined by the Zenar diode ZD1. Since the clamp voltage VZ1 is selected lower than the detecting voltage of the first circuit 22 but higher than the detecting voltages of the second and third circuits 23, 28, the first voltage detecting circuit 22 alone releases a detection signal. Consequently the power supply circuit 24 is activated to initiate power supply to the control device 25, thus displaying the exposure conditions through light measuring circuit 253 and display circuit 254 shown in FIG. 7. Upon complete depression of the shutter button the release switch S22 is also closed whereby the input voltage to the voltage detecting circuits 22, 23, 28 is clamped at the Zenar voltage VZ2 of the Zenar diode ZD2 lower than that of the Zenar diode ZD1. Since the clamp voltage VZ2 is selected lower than the threshold voltage of the second circuit 23 but higher than that of the third circuit 28, the first and second circuits 22, 23 both release detection signals to initiate, through the OR gate 29, the exposure sequence in the camera body 21. Upon completion of the exposure a motor 30 is started to conduct film take-up operation and shutter charging operation through unrepresented mechanisms therefor. Upon completion of film take-up operation the shutter release sequence is again rendered possible but is not initiated even if the release switch S22 is still in the closed state since the selecting circuit 256 in the single frame mode due to the absence of the detection signal from the third voltage detecting circuit 28. When the shutter button is freed from the depressed state, the switches S21, S22 are opened to make the power consumption zero in the entire circuit.

Figure 4:
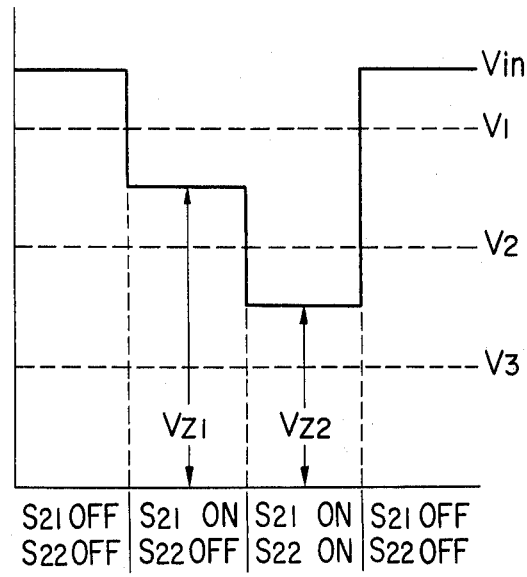
FIGS. 4 and 5 are charts showing the relation between the input voltage to the voltage detecting circuit and the switch operation.

FIG. 4 shows the relation between the input voltage Vin to said voltage detecting circuits and the various states of the switches S21, S22 when the switch Sa is open, wherein V1, V2 and V3 respectively represent the detecting voltages of the first, second and third voltage detecting circuits 22, 23, 28.

Figure 5:
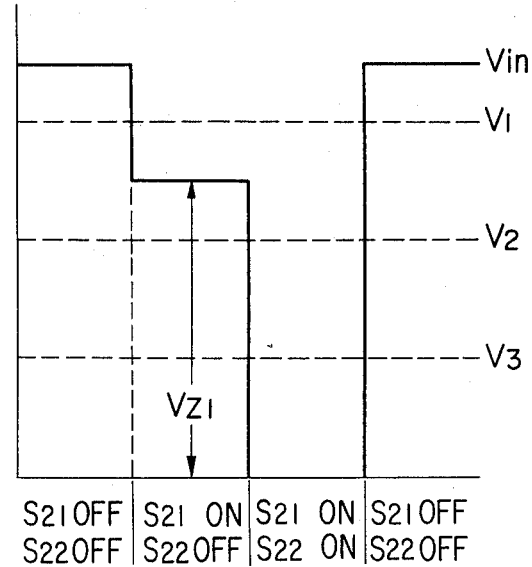

FIG. 5 shows the change of the input voltage in case the switch Sa is closed. The behavior is the same as explained in the foregoing when the half-push switch S21 alone is closed, but when the switch S22 is also closed upon full depression of the shutter button the first, second and third detecting circuits all release detection signals to operate the camera body 21 in the continuous photographing mode. In a remote control switch unit 27 to be connected to the remote control terminals a1, b1 there are provided a half-push switch S21' and a switch S22' to be closed in succession in response to the depression of an unrepresented push-button and respectively corresponding to the aforementioned switches S21 and S22 and Zenar diodes ZD1' and ZD2' similar to those in the camera body 21. In this manner the switches in the control unit 27 are capable of achieving the power supply control, shutter release control and photographing mode selection in the circuit of the camera body 21, through a single remote control terminal and a common terminal b1.

As explained in the foregoing, it is possible the present invention to realize plural control states in the camera or in the motor drive unit through the use of remote control terminals and remote control wires of a reduced number.

I claim:

1. In a circuit for controlling a camera or a motor drive device by means of a control switch unit connected through a pair of connecting terminals thereof to a pair of remote control terminals of said camera or motor drive device: said control switch unit comprises;
   (1) plural control switches and
   (2) a voltage generating circuit adapted for generating plural different voltages in response to various combinations of the states of said control switches: and said camera or motor drive device comprises;

(3) plural voltage detecting circuits of different detecting voltages for detecting the voltages supplied to said remote control terminals, whereby said camera or motor drive device is controlled in response to the outputs from said voltage detecting circuits.

2. A circuit according to the claim 1, wherein said plural control switches are connected in parallel between said pair of connecting terminals, said voltage generating circuit including means for selecting resistors connected to said switches in response to the states thereof, and said camera or motor drive device is so structured that a power source is connected between said pair of remote control terminals through a resistor of a determined resistance.

3. A circuit according to the claim 2, wherein said selecting means comprises a resistor of substantially zero resistance.

4. A circuit according to the claim 2, wherein said selecting means selects resistances respectively corresponding to said switches through the use of diodes.

5. A circuit according to the claim 2, wherein the detecting voltages of said plural voltage detecting circuits are selected lower than the voltage of said power source.

6. In a remote control unit for a camera or a motor drive device provided with a pair of remote control terminals, a resistor and power source serially connected between said remote control terminals and plural voltage detecting circuits of different detecting voltages for detecting the voltage supplied between said remote control terminals, said remote control unit comprising:

a pair of connecting terminals to be connected to said pair of remote control terminals: and plural serial circuits each composed of a switch and resistor means and connected in parallel between said pair of connecting terminals; said serial circuits being provided in the same number as that of said voltage detecting circuits, and the resistance of said resistor means being so selected that the voltage generated across said remote control terminals upon closure of the corresponding switch is determined in response to said switch and corresponding to a detecting voltage of one of said plural voltage detecting circuits.

* * * * *